(12) United States Patent
Ramsey

(10) Patent No.: US 7,303,200 B2
(45) Date of Patent: Dec. 4, 2007

(54) HANGER-FREE MOVABLE SUBFRAME FOR TRACTOR-TRAILERS

(75) Inventor: John Edward Ramsey, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 114 days.

(21) Appl. No.: 11/084,325

(22) Filed: Mar. 18, 2005

(65) Prior Publication Data

US 2005/0218646 A1 Oct. 6, 2005

Related U.S. Application Data

(60) Provisional application No. 60/559,114, filed on Apr. 2, 2004.

(51) Int. Cl.
*B60G 7/02* (2006.01)

(52) U.S. Cl. .............................. 280/124.109; 280/789; 280/797; 280/800

(58) Field of Classification Search ................ 180/209; 280/789, 790, 797, 800, 124.109, 124.128
See application file for complete search history.

(56) References Cited

U.S. PATENT DOCUMENTS

| | | | | |
|---|---|---|---|---|
| 3,406,439 A | * | 10/1968 | Hutchens | 29/897.2 |
| 3,761,109 A | * | 9/1973 | Campbell | 280/124.128 |
| 3,918,736 A | * | 11/1975 | Hickman | 280/676 |
| 4,095,818 A | * | 6/1978 | Smith | 280/789 |
| 5,088,763 A | * | 2/1992 | Galazin et al. | 280/656 |
| 6,073,947 A | * | 6/2000 | Gottschalk et al. | 280/124.128 |
| 6,135,470 A | * | 10/2000 | Dudding | 280/124.128 |
| 6,425,593 B2 | * | 7/2002 | Fabris et al. | 280/104 |
| 6,585,285 B2 | * | 7/2003 | Koch | 280/656 |
| 6,851,689 B2 | * | 2/2005 | Dudding et al. | 280/124.128 |
| 6,916,037 B2 | * | 7/2005 | Baxter et al. | 280/683 |
| 2005/0051991 A1 | * | 3/2005 | Saxon et al. | 280/149.2 |

* cited by examiner

*Primary Examiner*—Paul N. Dickson
*Assistant Examiner*—Toan C. To
(74) *Attorney, Agent, or Firm*—Buckingham, Doolittle & Burroughs, LLP.; David P. Dureska; Brent L. Moore

(57) ABSTRACT

A movable subframe or slider box for tractor-trailers includes a pair of elongated, longitudinally-extending, spaced-apart, parallel main members, and a plurality of cross members which extend between and are attached to the main members to form a rigid slider box structure. The slider box includes a retractable pin mechanism for selectively positioning the slider box beneath the trailer. The slider box supports one or more axle/suspension systems which in turn support the vehicle wheels and tires. The slider box is free of hangers for pivotally mounting beams of the axle/suspension systems on the slider box. The beams instead are pivotally mounted directly on the main members. Each main member has an inverted generally U-shaped configuration which forms a channel, so that a bushing assembly end of each beam nests within the channel of its respective main member and is pivotally attached thereto.

9 Claims, 10 Drawing Sheets

HANGER-FREE MOVABLE SUBFRAME FOR TRACTOR-TRAILERS

CROSS-REFERENCE TO RELATED APPLICATION

This application claims the benefit of U.S. Provisional Patent Application Ser. No. 60/559,114, filed Apr. 2, 2004.

BACKGROUND OF THE INVENTION

1. Field of the Invention

The invention relates to tractor-trailer subframes and, in particular, to movable subframes for tractor-trailers. More particularly, the invention is directed to a movable subframe for tractor-trailers that eliminates conventional hangers heretofore utilized to pivotally mount suspension assembly beams on the subframe, resulting in reduced stress on the frame and greater wheel stability, as well as a reduction in the number of parts, complexity, weight, and cost of the subframe.

2. Background Art

Movable subframes, typically referred to as slider boxes, slider subframes, slider undercarriages, or slider secondary frames, have been utilized on tractor-trailers or semi-trailers for many years. One or more axle/suspension systems usually are suspended from a single slider box. For purposes of clarity, hereinafter the present invention will be referred to as a slider box. It is understood that a slider box outfitted with usually two axle/suspension systems typically is referred to as a slider or slider tandem, and again, for purposes of clarity will hereinafter be referred to as a slider tandem. The slider tandem in turn is mounted on the underside of the trailer frame, and is movable longitudinally therealong to provide a means for variable load distribution and vehicular maneuverability.

More specifically, the amount of cargo that a trailer may carry is governed by local, state and/or national road and bridge laws, and is dependent on proper load distribution. The basic principle behind most road and bridge laws is to limit the maximum load that a vehicle may carry, as well as limit the maximum load that can be supported by individual axles. A trailer having a slider tandem gains an advantage with respect to laws governing maximum axle loads. More particularly, proper placement of the slider tandem varies individual axle loads or redistributes the trailer load so that it is within legal limits. Once properly positioned, the slider tandem is locked in place on the underside of the trailer by a retractable pin mechanism.

Conventional or prior art slider box designs were developed before the advent of air suspension systems for trailers. At that time, leaf spring suspension systems were the suspension of choice for van trailer frames and slider boxes. However, the leaf spring suspension system was unable to provide much load distribution for varying load situations.

Moreover, the subsequent development of air suspension systems provided load equalization among multiple axles for tractor-trailers, with or without the utilization of slider boxes, as well as improved ride quality for individual axles. Of course, the combination of a movable slider box and an air suspension system provided maximum versatility with respect to variable load distribution, load equalization and maneuverability in a trailer. Unfortunately, prior art slider boxes equipped with air suspensions add unwanted weight to the trailer, primarily because those slider boxes were originally built to support spring suspensions and adapting them to incorporate air suspensions required additional bracing and support. Such additional bracing and support has heretofore included the incorporation of frame brackets or frame hangers into the structure of the slider box as a means for pivotally mounting suspension beams of usually two leading or trailing arm air-ride axle/suspension systems on the slider box.

Thus, within the trucking industry, reducing the weight of carrier equipment without sacrificing durability directly improves productivity by increasing the available payload that can be transported by the vehicle. As a result, the trucking industry continually is striving for additional improvement in slider box design.

The present invention contributes to solving the problem of excessive weight, and improves performance without sacrificing durability in a slider tandem. More specifically, the present invention eliminates conventional hangers of the slider box heretofore utilized to pivotally mount suspension assembly beams of the one or more axle/suspension systems typically suspended from a slider box. This elimination of the structural hangers results in reduced stress on the slider box and greater wheel stability while, at the same time, reducing the number of parts, complexity, weight and cost of the slider box.

SUMMARY OF THE INVENTION

Objectives of the present invention include providing a slider box having a decreased number of parts, complexity and weight.

Another objective of the present invention is to provide such a slider box which exhibits improved performance.

A further objective of the present invention is to provide such a slider box which is cost efficient and durable in use.

These objectives and advantages are obtained by the frame for a heavy-duty vehicle of the present invention, the general nature of which may be stated as including a frame supporting at least one axle/suspension system having a pair of suspension assemblies, each one of the suspension assemblies including a beam having a pair of ends and having a bushing assembly at a selected one of the ends, the frame including at least a pair of elongated, longitudinally-extending parallel main members, and a plurality of cross members extending between and being rigidly attached to the main members, wherein the improvement comprises, at least one downwardly-facing channel formed in at least a portion of each one of the main members, the beam bushing assembly ends nesting in the channels of respective ones of the main members and being pivotally attached to the main members, whereby the frame is free of means other than the main members for pivotally attaching the beams to the frame.

BRIEF DESCRIPTION OF THE SEVERAL VIEWS OF THE DRAWINGS

The preferred embodiment of the present invention, illustrative of the best mode in which applicant has contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
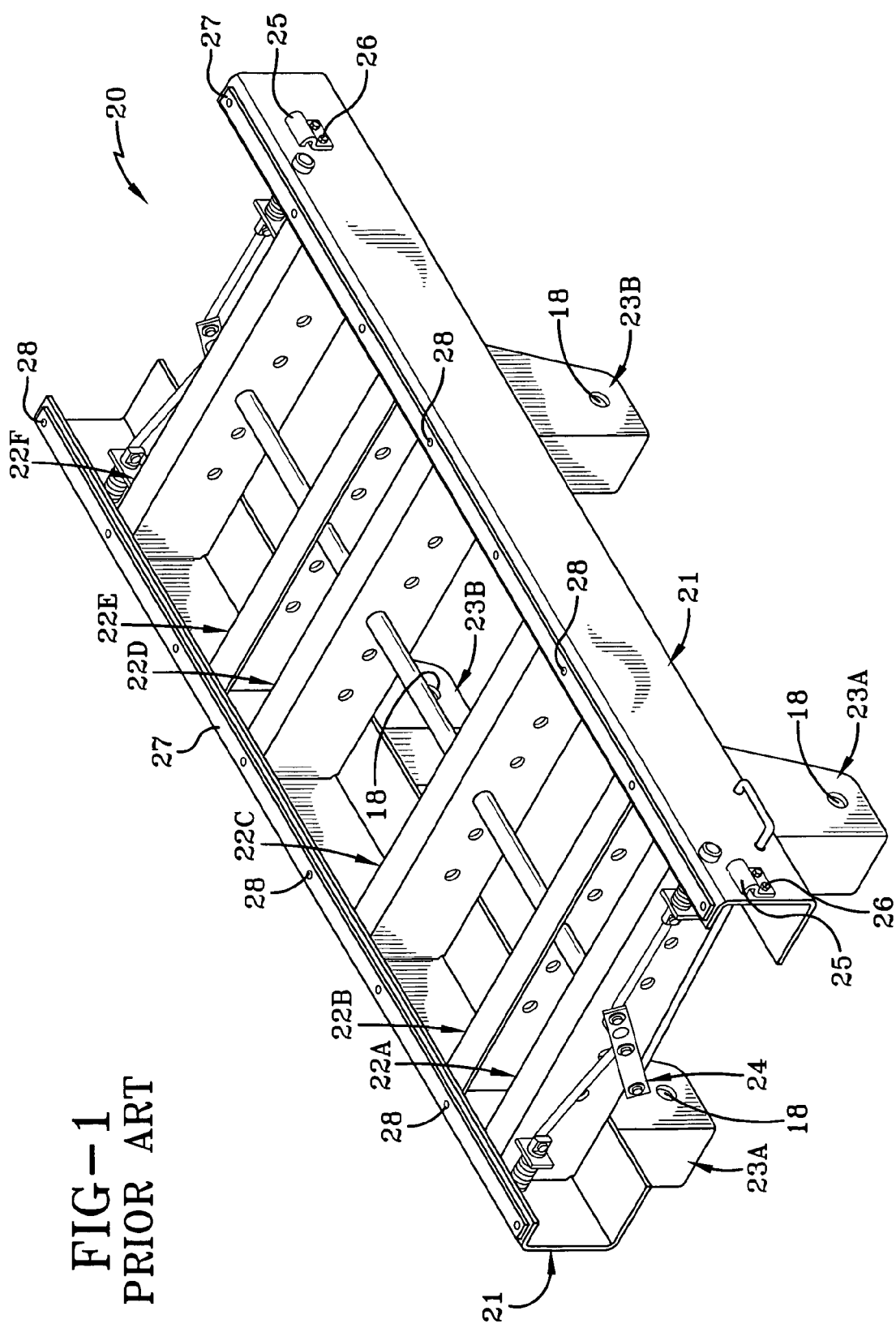
FIG. 1 is a perspective view of a prior art slider box, including depending hangers for pivotally mounting the beams of a pair of axle/suspension systems on the slider box.

So that the structure and operation of the slider box of the present invention may be best understood, a prior art slider box for a tractor-trailer is indicated generally at 20 and is shown in FIG. 1. Slider box 20 includes a pair of elongated longitudinally extending main members 21, a plurality of transversely extending cross members 22A through F, front and rear pairs of hangers 23A and 23B, respectively, for suspending axle/suspension systems, and a retractable pin mechanism 24 for selectively locking the slider box in place on and beneath the trailer primary frame.

Specifically, each main member 21 is an elongated, generally C-shaped beam made of a metal such as steel or other suitable material. The open portion of each main member 21 is opposed to the open portion of the other main member and faces inboard relative to slider box 20. Main members 21 are connected to each other in spaced-apart parallel relationship by cross members 22A-F, which extend between and are perpendicular to main members 21. Each end of each cross member 22 nests in the open portion of a respective one of main members 21, and is secured therein by any suitable means such as welding or mechanical fastening. Each cross member 22 is a generally C-shaped beam also made of a metal such as steel or other suitable material. Each front hanger 23A, also typically formed of a metal such as steel, is attached by welding or other suitable means, to the lowermost surface of a respective one of main members 21 at a location directly beneath cross members 22A, B. Each rear hanger 23B similarly is attached at a location directly beneath cross members 22D, E.

Each main member 21 has a pair of rail guides 25 mounted on its outboard surface by bolts 26. Each rail guide 25 is mounted adjacent to a respective one of the ends of main member 21. A low friction strip 27 is attached to the uppermost surface of each main member 21 by recessed fasteners 28, and extends generally the entire length of main member 21. Strip 27 is formed of any suitable low friction material, such as ultra-high molecular weight polyethylene.

Figure 2:
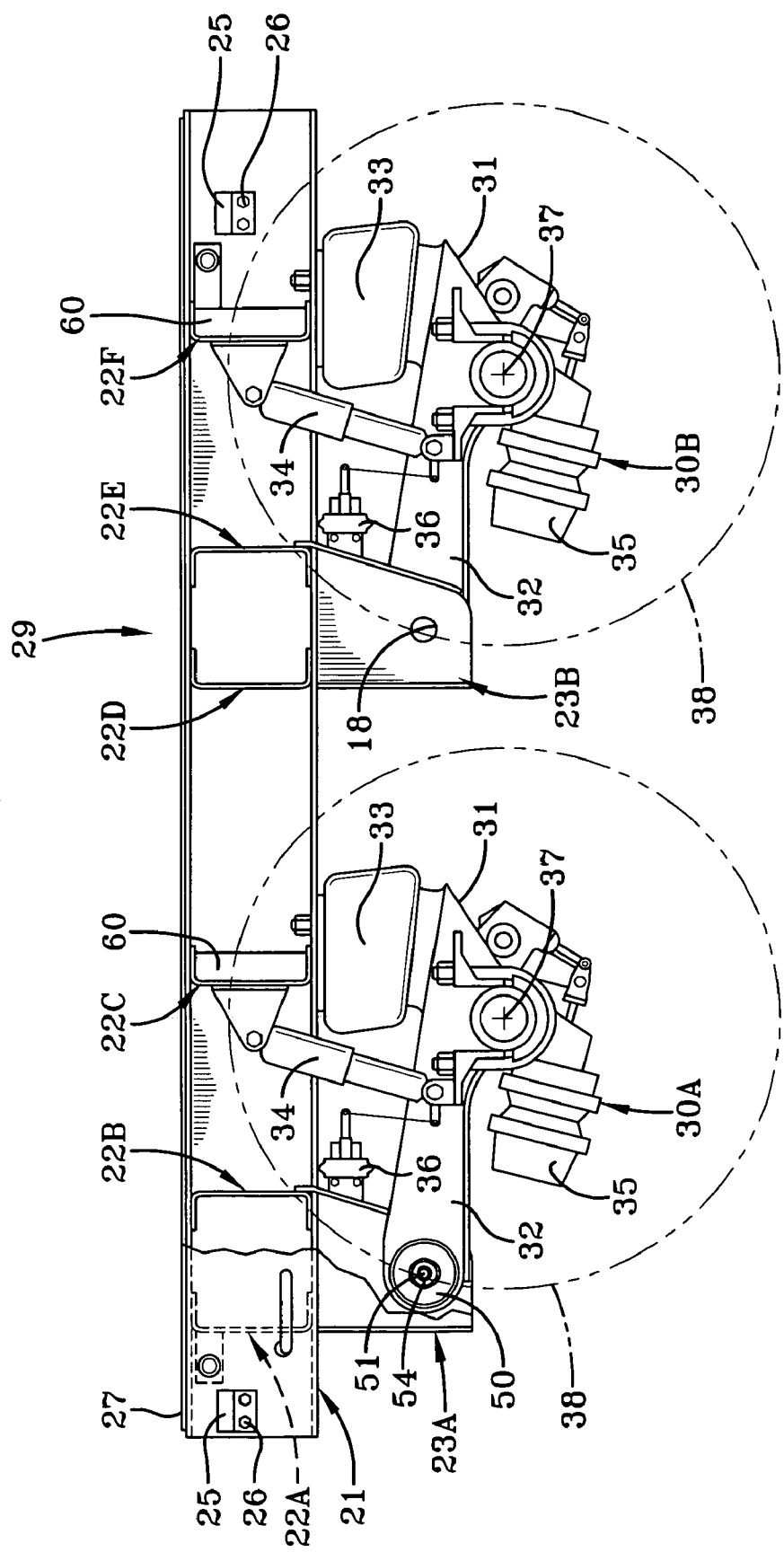
FIG. 2 is a side elevational view of the slider box shown in FIG. 1, with portions broken away and hidden-components shown in broken lines, and having a pair of axle/suspension systems mounted on the slider box, with wheels/tires shown in dot-dash lines.
Figure 3:
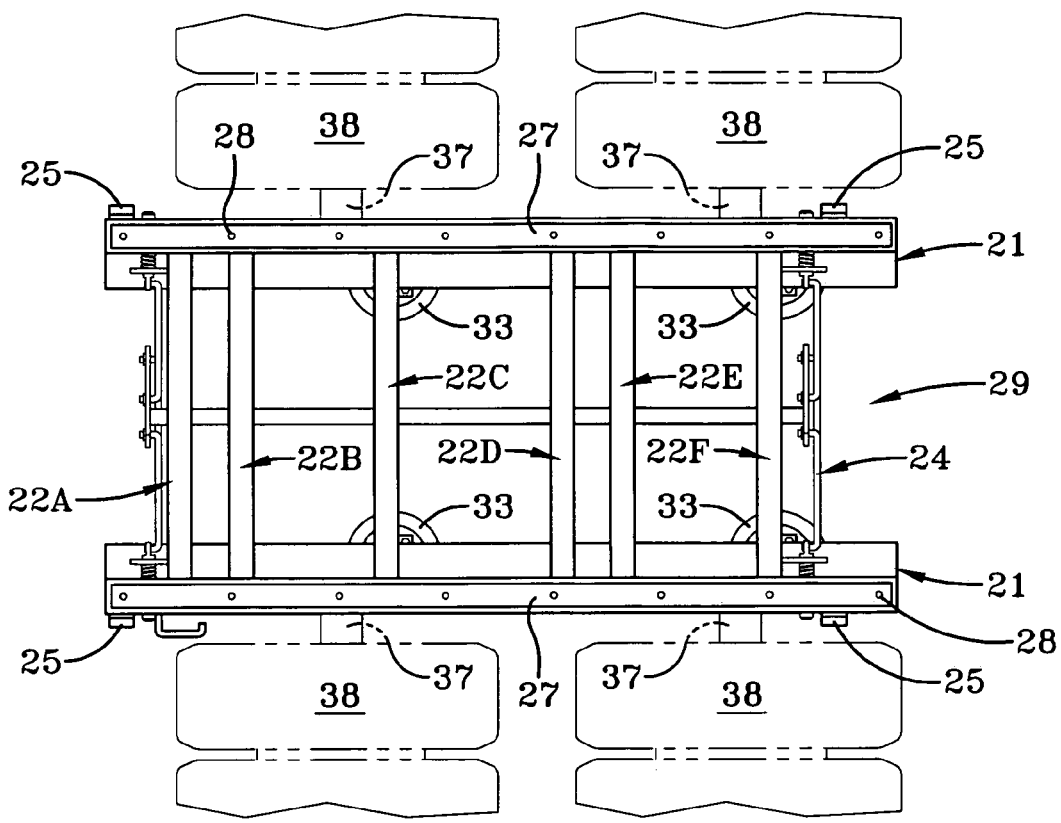
FIG. 3 is a reduced-size top plan view of the slider tandem shown in FIG. 2.

As mentioned hereinabove, and as best shown in FIGS. 2 and 3, slider box 20 of the prior art supports front and rear axle/suspension systems 30A and 30B, respectively, which combine to form a slider tandem, indicated generally at 29. Inasmuch as each axle/suspension system 30A, B is suspended from slider box 20, but does not form an integral part thereof, only the major components of system 30 will be cited for aiding in the description of the environment in which prior art slider box 20 operates. Each axle/suspension system 30A, B includes generally identical suspension assemblies 31 suspended from each hanger of the pair of hangers 23A, B, respectively. Each suspension assembly 31 includes a suspension beam 32 which is pivotally mounted on its respective hanger 23. More specifically, a bushing assembly 50 (FIG. 2) forms a part of the front end of beam 32. The bushing assembly 50 is formed with a continuous opening 54, which is aligned with a pair of aligned openings 18 formed in the inboard and outboard sidewalls of its respective hanger 23. A pivot bolt 51 is passed through the aligned bushing assembly continuous opening 54 and hanger openings 18 to pivotally mount suspension beam 32 on main member 21. An eccentric member (not shown) of bushing assembly 50, which is well-known in the suspension art, is captured on the outboard sidewall of each hanger 23 by structural stops or the like formed on the outboard sidewall of the hanger. The eccentric member enables alignment adjustment of each axle/suspension system 30. An air spring 33 is suitably mounted on and extends between the upper surface of the rearwardmost end of suspension beam 32 and main member 21 at a location directly beneath a certain one of the cross members 22C, F. A shock absorber 34 extends between and is mounted on suspension beam 32 and the certain cross member 22C, F. One or more reinforcement struts 60 are strategically attached within each cross member 22C, F to strengthen the cross member for supporting suspension assemblies 31. Other components of suspension assembly 31, mentioned herein only for the sake of relative completeness, include an air brake 35 and a height control valve 36. An axle 37 extends between and is captured in the pair of suspension beams 32 of each axle/suspension system 30A, B. Wheels 38 are mounted on each end of axle 37.

Figure 4:
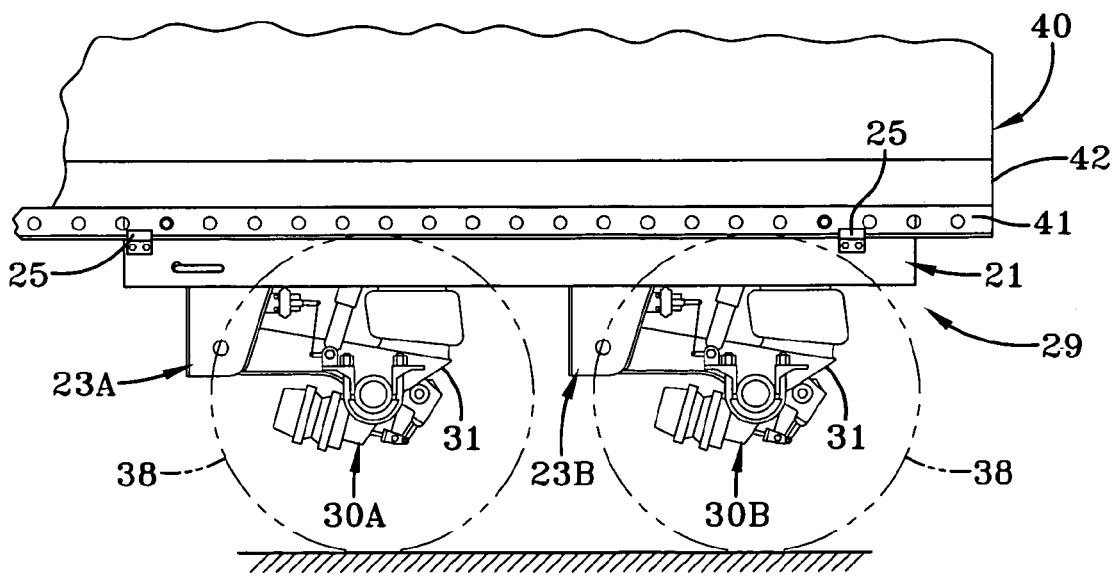
FIG. 4 is a fragmentary side elevational view of the slider tandem shown in FIGS. 2 and 3, shown movably mounted on the primary frame of a trailer of a tractor-trailer.
Figure 5:
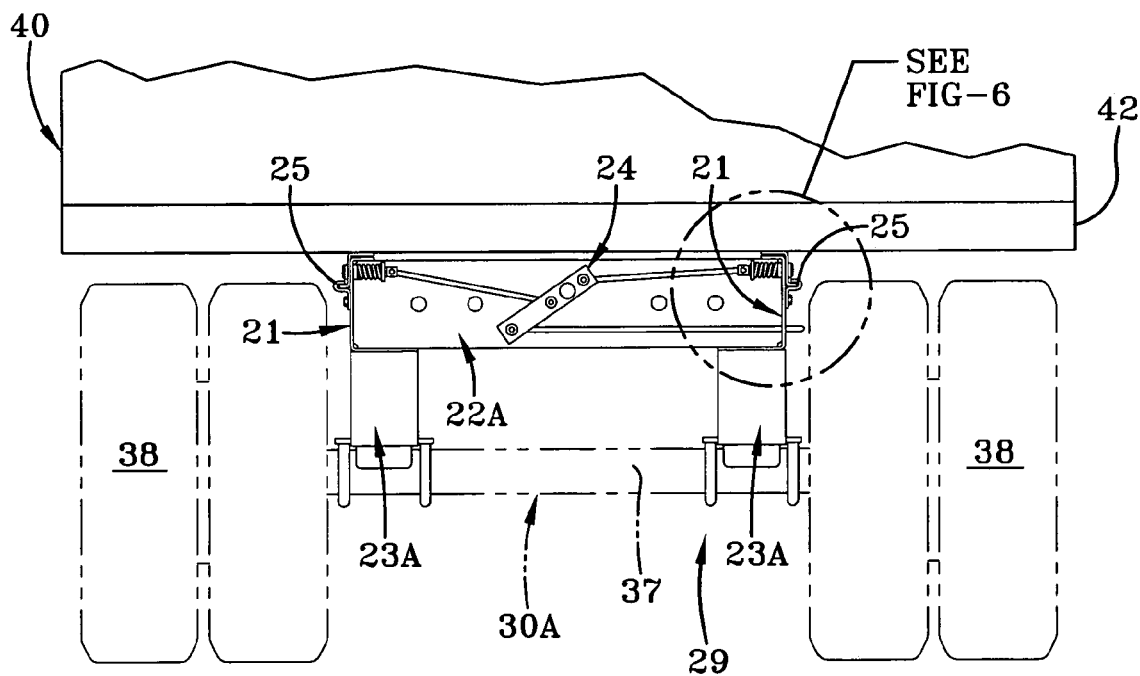
FIG. 5 is a front elevational view of the slider tandem mounted on the trailer shown in FIG. 4.
Figure 6:
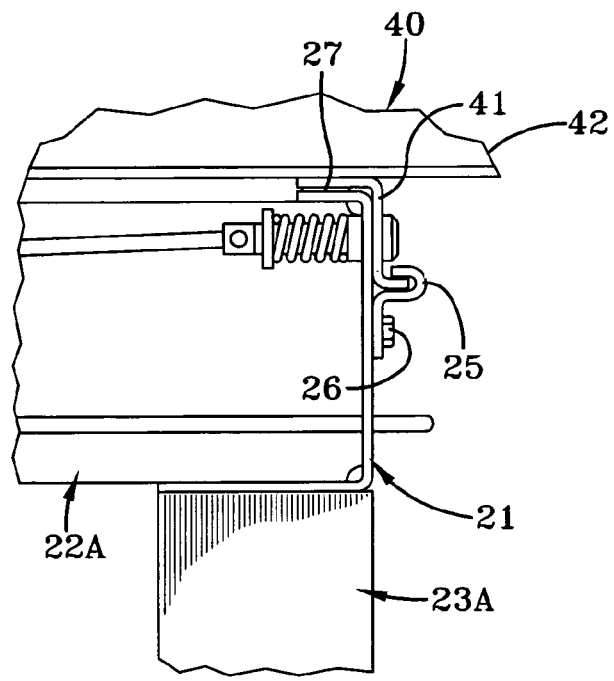
FIG. 6 is a fragmentary view taken from the circled portion of FIG. 5, showing the manner in which the movable slider box is immovably secured to the trailer frame.

Slider tandem 29 is movably mounted on a trailer body 40 (FIGS. 4-6) by slidable engagement of rail guides 25 with spaced apart, parallel and generally Z-shaped rails 41, which are mounted on and depend from the underside of usually the primary frame 42 of the trailer body. Each low friction strip 27 abuts the bottom surface of the uppermost portion of a respective one of rails 41 to provide a smooth, generally low-friction contact surface for slidable movement of slider tandem 29 on trailer body 40. Slider tandem 29 can be selectively positioned relative to trailer body 40 for optimum load distribution by retractable pin mechanism 24, as is well-known in the tractor-trailer art.

Figure 7:
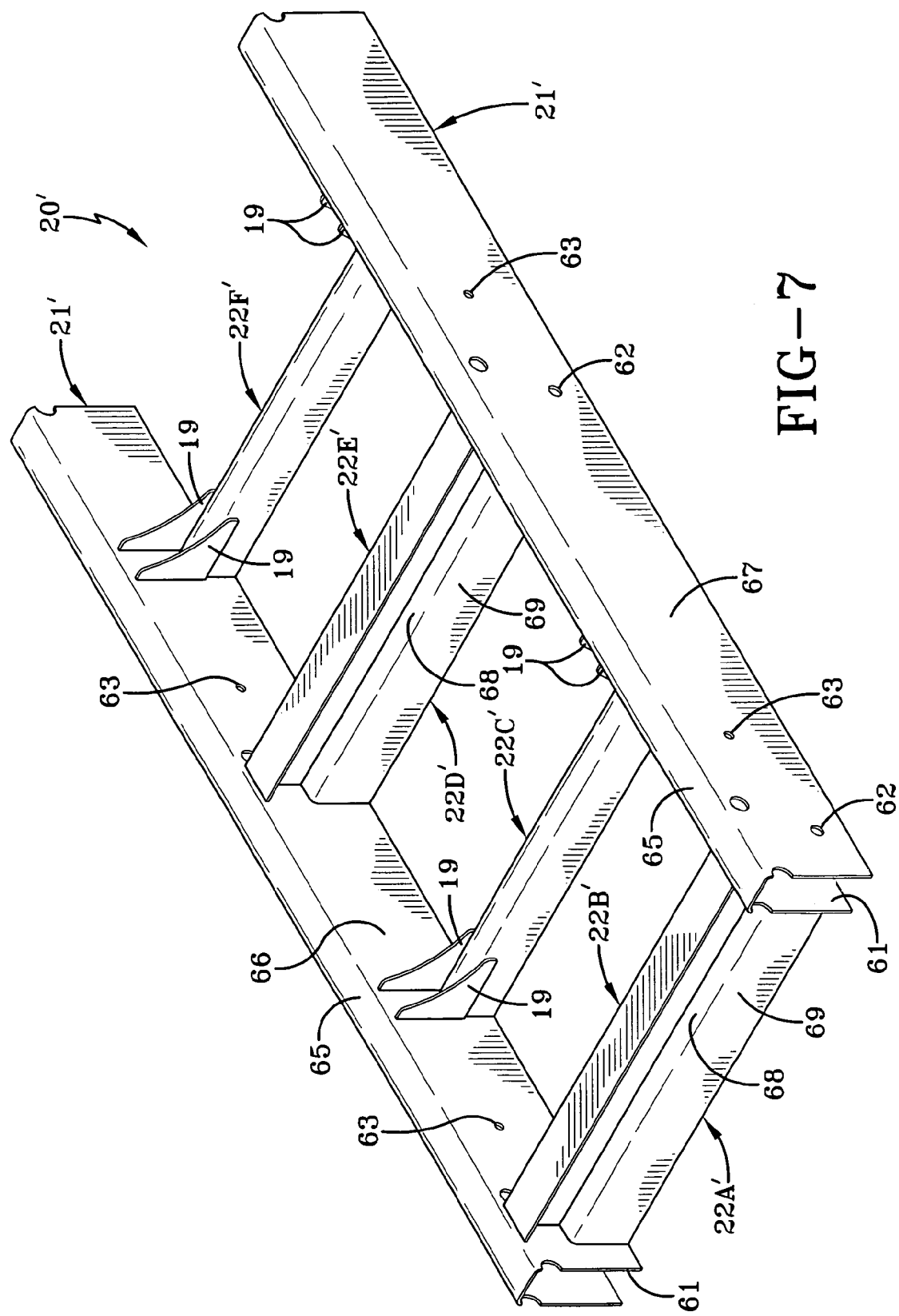
FIG. 7 is a perspective view of the hanger-free slider box for tractor-trailers of the present invention.

The slider box of the present invention is indicated generally at 20' and is shown in FIG. 7. Slider box 20', like prior art slider box 20, also includes a plurality of cross members 22A'-F'. However, one of the important features of the present invention is the elimination of hangers 23A, B by designing main members 21' to also function as hangers. This structural change results in several important advantages for inventive slider box 20'. The structure of slider box 20', and those advantages, now will be described in more detail.

Figure 8:
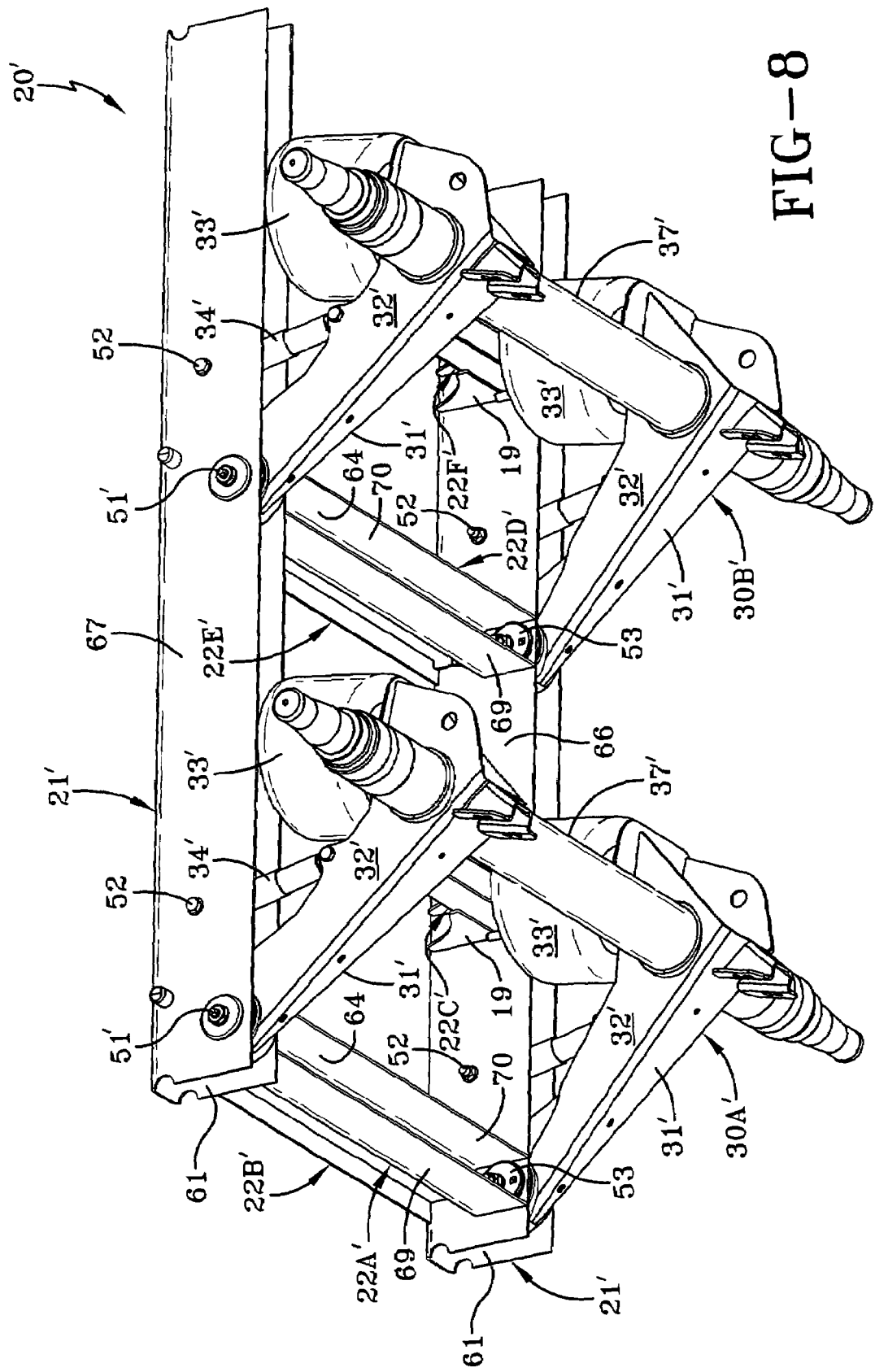
FIG. 8 is a bottom perspective view of slider box shown in FIG. 7, and further showing a pair of axle/suspension systems mounted on the slider box.
Figure 11:
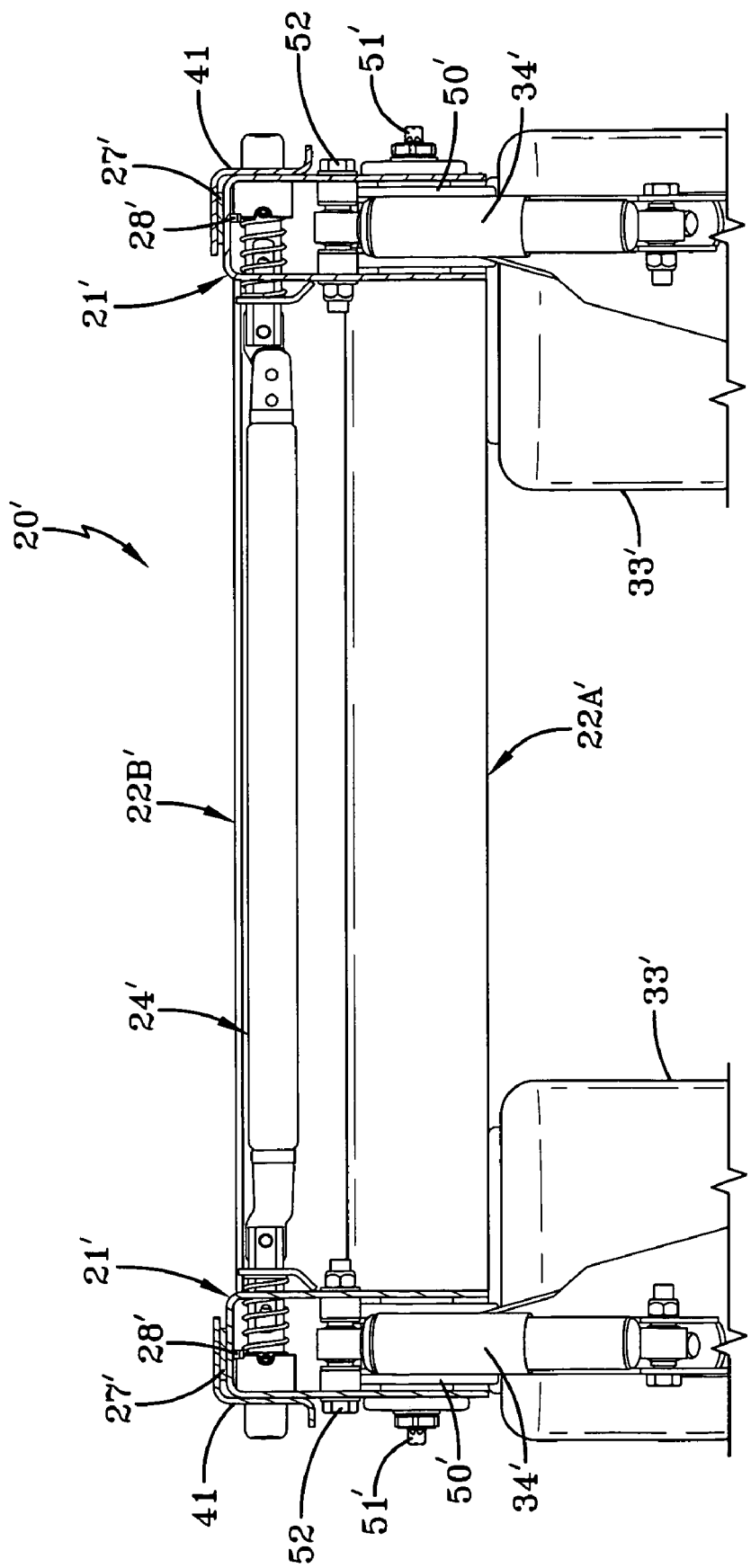
FIG. 11 is a sectional view taken along line 11-11 of FIG. 10.

Slider box 20' includes the pair of main members 21', the plurality of cross members 22A' through F' (FIG. 7), and a retractable pin mechanism 24' (FIGS. 8 and 11). Specifically, each main member 21' is an elongated, longitudinally extending, inverted generally U-shaped beam made of a metal such as steel, or other suitable material such as aluminum or a composite. In accordance with one of the key features of the present invention, the open portion or channel of each main member 21' faces downwardly and provides a yoke or pivotal mounting area for suspension beams and replaces prior art hangers 23A, B. Each main member 21' includes a horizontal top wall 65 and an inboard vertical sidewall 66 and an outboard vertical sidewall 67. Main members 21' are connected to each other in spaced-apart parallel relationship by cross members 22A' to F', which extend between and are perpendicular to main members 21'. Each cross member 22A'-F' preferably also is made of a metal such as steel or other suitable material such as aluminum or a composite. Each end of each cross member 22A'-F' is attached to inboard vertical sidewall 66 of its respective main member 21' by any suitable means, such as welds, bolts, rivets, hucks, or bonding. Cross members 22C' and F' further are supported by a plurality of gussets 19. More specifically, a pair of fore-aft spaced-apart generally wing-shaped gussets 19 each extend between and are welded to an upper portion of a respective one of the vertically extending walls of each end of cross members 22C', F', and the vertically-extending inboard sidewalls 66 of its respective main member 21'. Cross members 22B', E', which are disposed directly above and abut cross members 22A', D', respectively, alternatively can be integrally formed as a one-piece member with its respective cross member, such as by extrusion if cross members 22A', B', D', and E' are formed of a suitable material for such integral forming, such as aluminum. Cross members 22A', C', D', and F' each have an inverted generally U-shaped structure forming a downwardly-facing channel 64. Cross members 22A', C', D' and F' each include a horizontal top wall 68, a front vertical sidewall 69 and a rear vertical sidewall 70. Cross members 22B', E' each have a generally T-shaped cross-sectional configuration. However, it is understood that various other cross-sectional shapes, such as circular, are contemplated without affecting the overall concept of the present invention.

As best shown in FIGS. 8-11, slider box 20' supports front and rear axle/suspension systems 30A' and 30B', respectively. Inasmuch as each axle/suspension system 30A', B', is suspended from slider box 20' which combine to form a slider tandem, indicated generally at 29', but does not form an integral part thereof, only the major components of system 30' will be cited for aiding in the description of the environment in which present invention slider box 20' is used. Each axle/suspension system 30A', B', includes generally identical suspension assemblies 31' suspended from each main member 21', without the use of depending hangers 23 as in prior art slider boxes, such as slider box 20. Each suspension assembly 31' includes a suspension beam 32' which is pivotally mounted within the downwardly-facing channel or yoke 61 of its respective inverted generally U-shaped main member 21', instead of within hangers depending from main members. Beams 32' are pivotally bolted to the main members 21'. More specifically, a bushing assembly 50' forms a part of the front end of beam 32'. Bushing assembly 50' is formed with a continuous opening (not shown), which is aligned with a pair of aligned openings 62 formed in inboard and outboard sidewalls 66, 67, respectively, of each main member 21'. The continuous opening of bushing assembly 50' is aligned with main member openings 62, such that a pivot bolt 51' can be passed through the bushing assembly continuous opening and aligned main member openings 62 to pivotally mount suspension beam 32' on main members 21'. Front and rear vertical sidewalls 69, 70, respectively, of cross members 22A' and 22D' capture a respective pair of eccentric members 53 of bushing assemblies 50' in each cross member channel 64 (FIGS. 8 and 10) to enable alignment adjustment of each axle/suspension system 30'. An air spring 33' is suitably mounted on and extends between the upper surface of the rearwardmost end of each suspension beam 32' and main member 21' at a location directly beneath a certain one of the cross members 22C', F'. A shock absorber 34' extends between and is mounted at its lower end on suspension beam 32', and at its upper end is mounted within the downwardly-facing channel 61 of its respective main member 21'. More specifically, a pair of aligned openings 63 is formed in each vertical sidewall 66, 67 of each main member 21' at a location intermediate cross members 22A', 22C' and 22D', 22F', respectively. A bolt 52 passes through openings 63, and an aligned opening (not shown) formed in an upper end of shock absorber 34', for convenient mounting of the shock absorber. Although each shock absorber 34' is shown mounted frontwardly of its respective air spring 33', it is understood that the shock absorber can be mounted in other locations, such as preferably rearwardly of the air spring, without affecting the overall concept of the present invention. Gussets 19 strengthen their respective related cross members 22C', F' for supporting suspension assemblies 31'. An axle 37' extends between and is captured in the pair of suspension beams 32' of each axle/suspension system 30A', B'. Beams 32' capture axle 37'. However, it is understood that other means for capturing axle 37' can be employed, such as U-bolts, depending on the type of suspension assembly used with slider box 20' of the present invention. Other components of each suspension assembly 31', mentioned herein only for the sake of relative completeness, include an air brake and height control valve (both not shown). Wheels (not shown) are mounted on each end of axle 37' in a usual manner.

Figure 9:
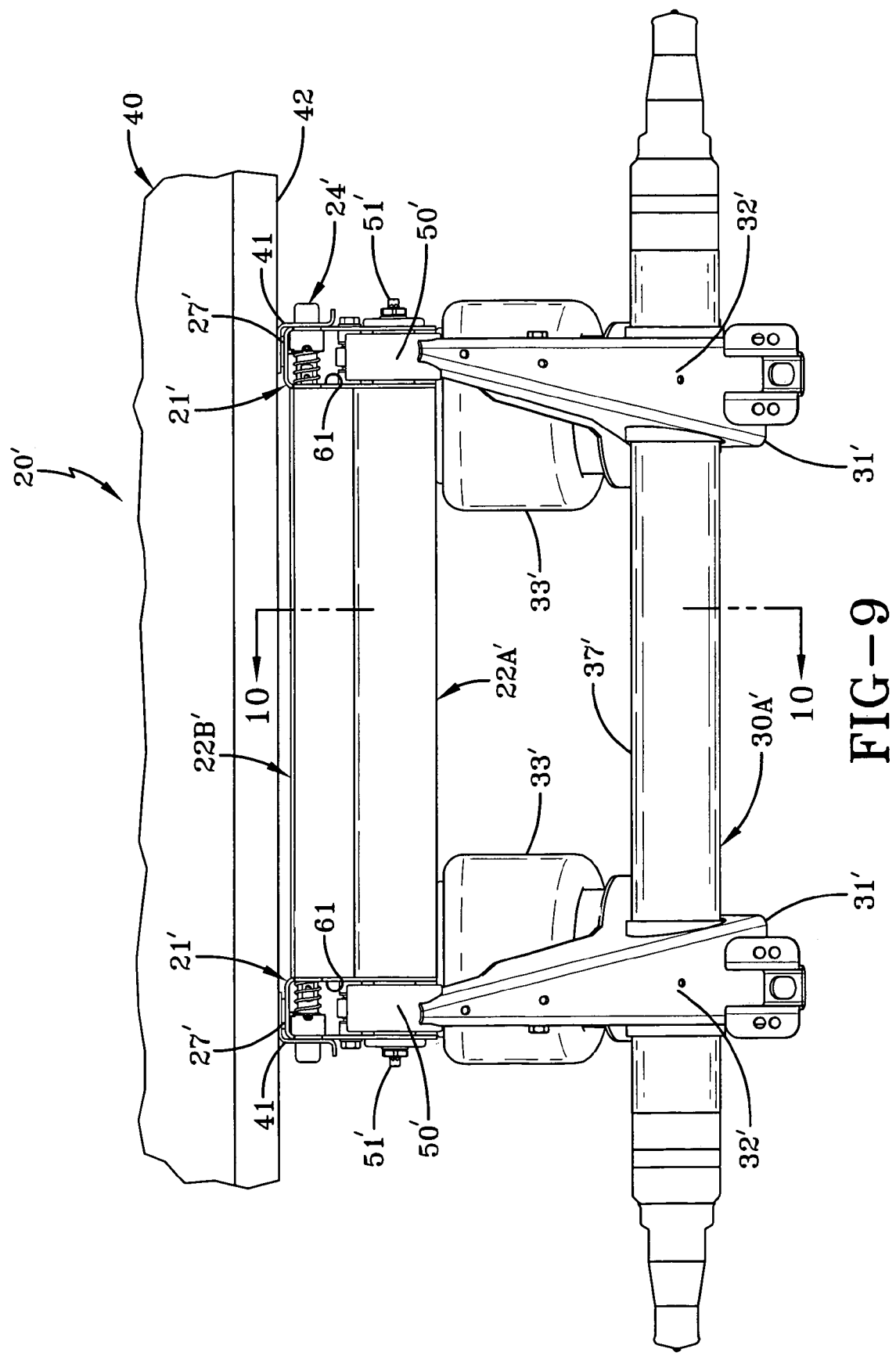
FIG. 9 is a fragmentary front elevational view of the slider tandem shown in FIG. 8, and additionally showing the manner in which the movable slider tandem is immovably secured to the trailer frame.
Figure 10:
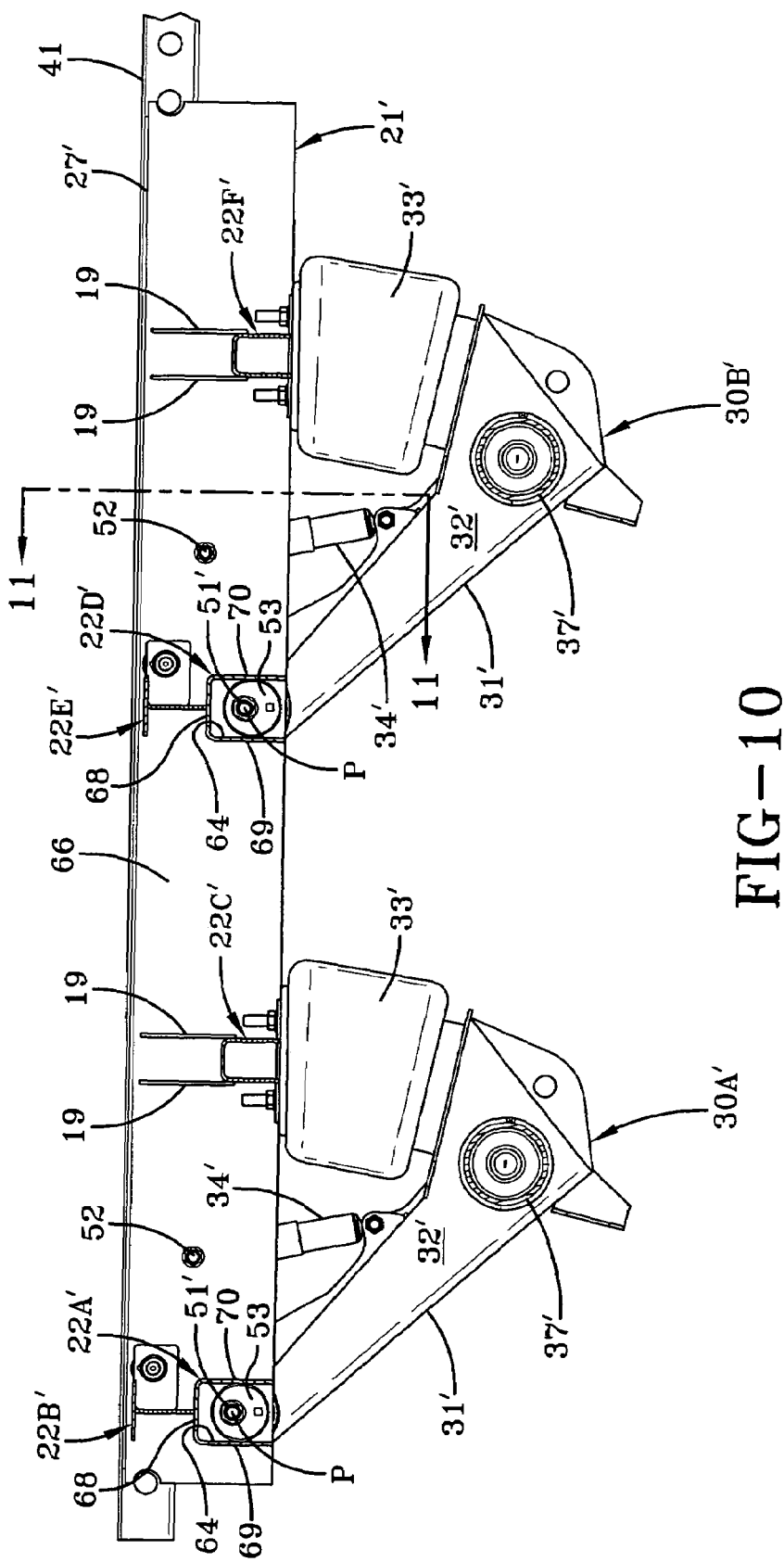
FIG. 10 is a sectional view taking along line 10-10 of FIG. 9.

As best shown in FIGS. 9-11, slider 20' is movably mounted on a primary frame 42 of a trailer body 40 by slidable engagement of rail guides (not shown) mounted on the outboard surface of outboard sidewall 67 of each main member 21', with spaced-apart, parallel and generally Z-shaped rails 41, which typically are mounted on and depend from the underside of the trailer body primary frame. It is understood that the rail guides are an optional safety feature. A low-friction strip 27' mounted on top wall 65 of each main member 21' by recessed fasteners 28', abuts the bottom surface of the uppermost portion of respective ones of rails 41 to provide a smooth, generally low-friction contact surface for slidable movement of main rails 21' on the trailer body. Slider tandem 29' thus can be selectively positioned relative to trailer body 40 for optimum load distribution by retractable pin mechanism 24'.

Figure 12:
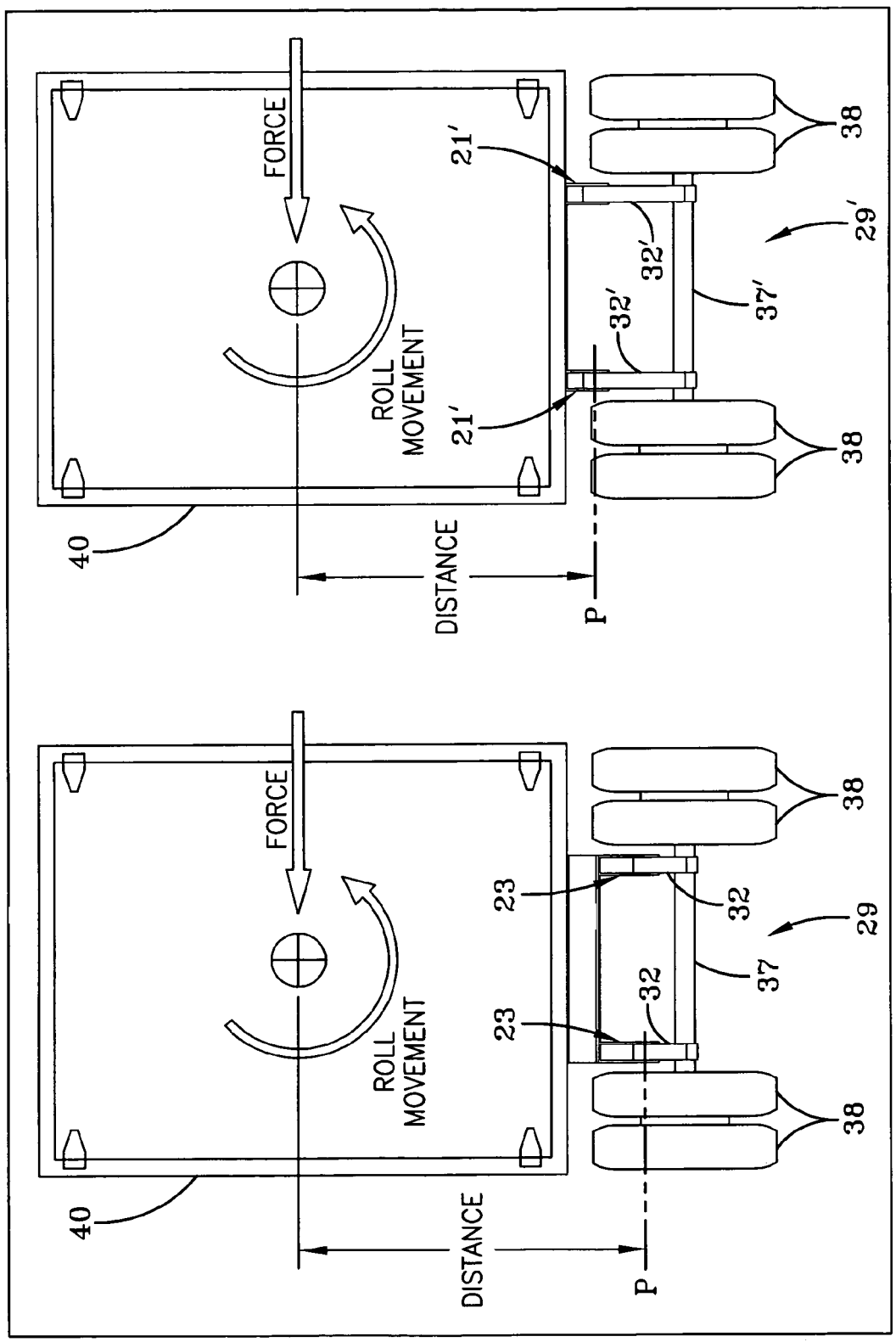
FIG. 12 is a schematic representation looking from the rear of a tractor-trailer, showing the manner in which the stability of the tractor-trailer is improved by the slider box of the present invention over prior art slider boxes.

As best illustrated in FIG. 10 and the schematic illustrations of FIG. 12, the inventive design of slider box 20' of the present invention raises the pivot point P of slider tandem 29' about 10 inches higher than the pivot point of prior art slider tandem 29 shown in FIGS. 1-6. Raising the pivot point for the attachment of suspension beams 32' directly to slider box 20', and without the need for prior art hangers 23, reduces by about sixty percent the moment arm involved in the transmission of side load and fore-aft forces into the reaction area of slider tandem 29'. This reduction in the moment arm in turn results in a reduction of certain bending stresses by about sixty percent as well. It also is a fact that reducing the moment arm also results in a reduction of certain torsional stresses. Those torsional stresses heretofore created the need for changing the cross member configuration of slider boxes that resulted in U.S. Pat. No. 5,720,489, owned by the assignee of the present invention, in which K-shaped cross members were utilized, rather than a plurality of parallel, fore-aft spaced-apart cross members as shown in prior art FIGS. 1-3. Raising the pivot point attachment of suspension beams 32' to slider box 20' also reduces the roll moment arm shown in the right-hand drawing of FIG. 12, that is, the distance from the center of gravity of the loaded trailer to the point at which the suspension reacts side load forces. The roll moment arm distance multiplied by the lateral acceleration at the center of gravity determines the tipping force that any trailing arm axle/suspension system must counteract in order to achieve an acceptable roll stability characteristic. The roll moment arm is reduced by about sixteen percent for high center of gravity applications and by greater percentages for lower center of gravities. Such roll moment reduction results in greater roll stability and extends the life of the roll compliance components such as bushing assemblies 50'. Moreover, elimination of prior art hangers 23A, B significantly reduces parts, complexity, weight, and cost.

Moreover, the downward-facing channel of each main member 21', in addition to serving as a pivotal mounting structure for suspension beams 32', also serves as a convenient and effective mounting location for the upper end of shock absorbers 34', without the use of additional brackets and the like.

In addition, the clamp loads resulting from suspension pivot bolts 51' and shock absorber bolts 52 work to stabilize the shapes of main members 21', thus contributing to the overall structural integrity of slider box 20'.

Another feature and resulting benefit of the present invention is best shown in FIGS. 8 and 10. More particularly, eccentric member 53 of each suspension bushing assembly 50' is guided by cross members 22A' and D' since it fits within downwardly-facing channel 64 of its respective cross member and is guided by vertical sidewalls 69, 70 of the cross member during alignment adjustment of its respective axle/suspension system 30'.

The shorter moment arm described hereinabove also reduces the propensity of slider box 20' to bend at a location rearward of the pivotal mounting point of the forward suspension beams 32', which heretofore typically resulted from one-wheel collisions with imposing obstacles, such as a guardrail, at certain speeds. Thus, the shorter moment arm may eliminate the need for torsional bracing.

The difficulty of manufacturing slider box 20' also is reduced because it eliminates the need for proper positioning of hangers, heretofore required to ensure that the driver's side suspension beam attachment area was the correct lateral distance from the curb side suspension beam attachment area for proper fit of the suspension beams and axle weldments.

Since prior art hangers extended downward from the underside of a slider box by about twelve inches, the slider tandems were nested by opposing ends and top to bottom for shipping economy. Nesting is unnecessary for the present invention slider box 20' and its associated axle/suspension systems 30A', B', thus approximately doubling the number of slider tandems 29' that can fit on a trailer for shipping and reducing the handling complexities at both manufacturing plants and at trailer building plants.

Finally, since roll inputs are reduced, the use of thinner axle tube walls may also be possible. It is contemplated that the present invention also can be utilized for primary frames that support non-movable subframes, as well as primary frames that do not support a subframe. Moreover, it is contemplated that the slider box 20' of the present invention can be utilized on heavy-duty vehicles other than tractor-trailers. Such other heavy-duty vehicles include trailers such as dump trailers, grain trailers, tanker trailers, livestock trailers, and low-boy trailers. Also included are heavy-duty vehicles without trailers such as straight trucks, which include dump trucks, cement mixers, fire trucks, and the like.

It is understood that axle/suspension systems other than systems 30A' and 30B' shown and described herein, can be utilized in connection with slider box 20' of the present invention.

Accordingly, the hanger-free movable subframe for tractor-trailers of the present invention is simplified, provides an effective, safe, inexpensive and efficient structure which achieves all the enumerated objectives, provides for eliminating difficulties encountered with prior art movable subframes, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the hanger-free movable subframe for tractor-trailers of the present invention is used and installed, the characteristics of the construction, arrangement and method steps, and the advantageous, new and useful results obtained; the new and useful structures, devices, elements, arrangements, processes, parts and combinations are set forth in the appended claims.

What is claimed is:

1. A frame for a heavy-duty vehicle, said frame supporting at least one axle/suspension system having a pair of suspension assemblies, each one of said suspension assemblies including a beam having a pair of ends and having a bushing assembly at a selected one of said ends, said frame including at least a pair of elongated, longitudinally-extending parallel main members, and a plurality of cross members extending between and being rigidly attached to said main members in generally the same horizontal plane as the main members, wherein the improvement comprises:

at least one downwardly-facing channel formed in at least a portion of each one of said main members, said beam bushing assembly ends nesting in said channels of respective ones of the main members and being pivotally attached to said main members generally in said same horizontal plane of the main members and said cross members, whereby said frame is free of depending hangers for attaching said beams to the frame.

2. The frame for a heavy-duty vehicle of claim 1, in which each one of said main members has an inverted generally U-shaped continuous cross section; and in which each one of the main members includes a generally horizontal top wall and a pair of spaced-apart, parallel generally vertical sidewalls.

3. The frame for a heavy-duty vehicle of claim 2, in which at least a first pair of aligned openings is formed in said vertical sidewalls of each one of said main members; in which each one of said beam bushing assemblies is formed with a continuous opening; in which each one of said beam bushing assembly continuous openings is aligned with a respective one of said main member vertical sidewall first pair of aligned openings; and in which a pivot bolt is passed through each one of the first pair of aligned openings and the beam bushing assembly continuous opening, and is secured to said respective main member for pivotally mounting said suspension assembly beams directly on the main members.

4. The frame for a heavy-duty vehicle of claim 3, in which each one of a pair of shock absorbers has upper and lower ends and extends between and is attached to a respective one of said beams and said main members; in which a second pair of aligned openings is formed in the vertical sidewalls of each one of said main members; in which a continuous opening is formed in said upper end of each one of said shock absorbers; and in which a bolt passes through said second pair of aligned openings and said shock absorber continuous opening to mount the upper end of the shock absorbers directly on the main members.

5. The frame for a heavy-duty vehicle of claim 1, in which said frame is a slider box movably mounted on a primary frame of said heavy-duty vehicle; and in which said slider box includes a retractable pin mechanism for selectively longitudinally positioning the slider box beneath said vehicle primary frame.

6. The frame for a heavy-duty vehicle of claim 1, in which a downwardly-facing channel is formed in at least a portion of at least one of said plurality of cross members; in which said cross member having said downwardly-facing channel includes a generally horizontal top wall and a pair of longitudinally-spaced parallel generally vertical front and rear walls; and in which said front and rear walls of the cross member capture an eccentric member of said beam bushing assembly for alignment adjustment of said axle/suspension system.

7. A frame for a heavy-duty vehicle, said frame supporting at least one axle/suspension system having a pair of suspension assemblies, each one of said suspension assemblies including a beam having a pair of ends and having a bushing assembly at a selected one of said ends, said frame including at least a pair of elongated, longitudinally-extending parallel main members, and a plurality of cross members extending between and being rigidly attached to said main members, wherein the improvement comprises:

each one of said main members having an inverted generally U-shaped continuous cross section, said main members each further including a generally horizontal top wall and a pair of spaced-apart, parallel generally vertical sidewalls, first and second pairs of aligned openings being formed in said vertical sidewalls of each one of the main members, each one of said beam bushing assemblies being formed with a continuous opening, each one of said beam bushing assembly continuous openings being aligned with a respective one of said main member vertical sidewall first pair of aligned openings, a pivot bolt being passed through each one of the first pair of aligned openings and the beam bushing assembly continuous opening, said pivot bolt being secured to said respective main member for pivotally mounting said suspension assembly beams directly on the main members, each one of a pair of shock absorbers having upper and lower ends and extending between and being attached to a respective one of said beams and said main members, a continuous opening being formed in said upper end of each one of said shock absorbers, and a bolt passing through said second pair of aligned openings and said shock absorber continuous opening to mount the upper end of the shock absorbers directly on the main members, whereby said frame is free of means for pivotally attaching said beams to the frame other than said pivotal attachment to said main members.

8. A slider box movably mounted on a primary frame of a heavy-duty vehicle, said slider box supporting at least one axle/suspension system having a pair of suspension assemblies, each one of said suspension assemblies including a beam having a pair of ends and having a bushing assembly at a selected one of said ends, said slider box including at least a pair of elongated, longitudinally-extending parallel main members, a plurality of cross members extending between and being rigidly attached to said main members, the slider box having a retractable pin mechanism for selectively longitudinally positioning said slider box beneath said vehicle primary frame, wherein the improvement comprises:

at least one downwardly-facing channel formed in at least a portion of each one of said main members, said beam bushing assembly ends nesting in said channels of respective ones of the main members and being pivotally attached to said main members, whereby said slider box is free of means for pivotally attaching said beams to the slider box other than said pivotal attachment to the main members.

9. A frame for a heavy-duty vehicle, said frame supporting at least one axle/suspension system having a pair of suspension assemblies, each one of said suspension assemblies including a beam having a pair of ends and having a bushing assembly at a selected one of said ends, said frame including at least a pair of elongated, longitudinally-extending parallel main members, and a plurality of cross members extending between and being rigidly attached to said main members, wherein the improvement comprises;

at least one downwardly-facing channel formed in at least a portion of each one of said main members and at least a portion of at least one of said plurality or cross members, said cross member having said downwardly-facing channel including a generally horizontal top wall and a pair of longitudinally-spaced parallel generally vertical front and rear walls, said front and rear walls of the cross members capturing an eccentric member of said beam bushing assembly for alignment adjustment of said axle/suspension system, said beam bushing assembly ends nesting in said channels of respective ones of the main members and being pivotally attached to said main members, whereby said frame is free of means for pivotally attaching said beams to the frame other than said pivotal attachment to the main members.

* * * * *

UNITED STATES PATENT AND TRADEMARK OFFICE
CERTIFICATE OF CORRECTION

| | |
|---|---|
| PATENT NO. | : 7,303,200 B2 |
| APPLICATION NO. | : 11/084325 |
| DATED | : December 4, 2007 |
| INVENTOR(S) | : John Edward Ramsey |

It is certified that error appears in the above-identified patent and that said Letters Patent is hereby corrected as shown below:

Claim 9, Column 10, line 47, by deleting the word "or" and inserting therefor the word --of--.

Signed and Sealed this

Twenty Second Day of April, 2008

JON W. DUDAS
*Director of the United States Patent and Trademark Office*